United States Patent [19]

Shinozaki et al.

[11] 4,445,136
[45] Apr. 24, 1984

[54] TELEVISION CAMERA HAVING AN OPTICAL LOWPASS FILTER

[75] Inventors: Takashi Shinozaki, Yokohama; Yoshichi Ohtake, Kamakura; Shinsuke Ono, Yokosuka, all of Japan

[73] Assignee: Victor Company of Japan, Ltd., Kanagawa, Japan

[21] Appl. No.: 329,694

[22] Filed: Dec. 11, 1981

[30] Foreign Application Priority Data

Dec. 16, 1980 [JP] Japan ................................ 55-180649

[51] Int. Cl.³ .............................................. H04N 9/10
[52] U.S. Cl. ...................................................... 358/55
[58] Field of Search .................... 358/55; 350/162.11, 350/162.12, 162.15, 162.16, 162.17, 162.19, 162 SF

[56] References Cited

U.S. PATENT DOCUMENTS

| | | | |
|---|---|---|---|
| 3,641,255 | 2/1972 | Macovski | 350/162.19 |
| 3,821,794 | 6/1974 | Yoneyama | 350/162.12 |
| 4,178,611 | 12/1979 | Okano | 358/55 |
| 4,318,123 | 3/1982 | Knop | 358/55 |

FOREIGN PATENT DOCUMENTS

| | | |
|---|---|---|
| 2359512 | 5/1974 | Fed. Rep. of Germany . |
| 2027035 | 8/1976 | Fed. Rep. of Germany . |
| 2137466 | 1/1977 | Fed. Rep. of Germany . |
| 604190 | 4/1978 | U.S.S.R. ................. 358/55 |

Primary Examiner—Michael A. Masinick
Attorney, Agent, or Firm—Anthony H. Handal

[57] ABSTRACT

A television camera has an optical system including an iris, a master lens, and a color stripe filter. The television camera further comprises an optical lowpass filter provided within an effective light path of an afocal system which reaches the master lens through the iris. The optical lowpass filter has a shape to partially produce an optical lowpass filter effect with respect to a part of a beam in the effective light path.

9 Claims, 8 Drawing Figures

TELEVISION CAMERA HAVING AN OPTICAL LOWPASS FILTER

BACKGROUND OF THE INVENTION

The present invention generally relates to television cameras having an optical lowpass filter, and more particularly to a television camera having an optical lowpass filter which prevents the generation of color beat, and prevents degradation of the resolution.

In a television camera which uses a single image pickup tube, a color separating optical system including a color stripe filter is used. However, in this optical system, beat is introduced between the high-frequency component of the luminance signal and the chrominance signal. Accordingly, in order to reduce the high-frequency component of the luminance signal so as to reduce the above beat, an optical low-pass filter (generally having an attenuation pole) is generally employed.

As a conventional optical lowpass filter of the above type, there are those which use a crystal plate and those which use a polyhedron prism. Further, there are optical lowpass filters which use bi-prisms previously proposed by the present inventors.

However, in the above type of a conventional optical lowpass filter used in a television camera, the optical lowpass filter is constructed so as to provide an optical lowpass filter effect throughout the entire surface of an effective light path of a beam which reaches an image pickup surface of the image pickup tube through an iris. Accordingly, since the optical lowpass filter is originally used to prevent the generation of the color beat, the generation of the color beat is naturally prevented by the use of the optical lowpass filter. However, because the high frequency range part of the beam is attenuated, the resolution is degraded. For example, there was a disadvantage in that fine stripes could not be picked up clearly.

SUMMARY OF THE INVENTION

Accordingly, it is a general object of the present invention to provide a novel and useful television camera having an optical lowpass filter.

Another and more specific object of the present invention is to provide a television camera having an optical lowpass filter constructed so that the optical lowpass filter is not interposed throughout the entire surface of the effective light path, to partially give an optical lowpass filter effect to the effective beam. According to the television camera of the present invention, an effect to prevent the generation of the color beat is obtained to a certain extent, and the resolution is not degraded by a large quantity.

Still another object of the present invention is to provide a television camera having an optical lowpass filter constructed so that the optical lowpass filter effect differs when an iris stops or passes the incoming beam. According to the television camera of the present invention, when the image is picked up in a relatively dark room wherein the quantity of the color beat generated is small, for example, the optical lowpass filter is relatively not effective to a large extent and the image pickup operation can be performed with a large resolution. On the other hand, when the image is picked up outdoors where it is bright and the color beat is easily generated, the optical lowpass filter becomes relatively effective and the effect to prevent the generation of the color beat is increased.

Other objects and further features of the present invention will be apparent from the following detailed description when read in conjunction with the accompanying drawings.

DETAILED DESCRIPTION

Figure 1:
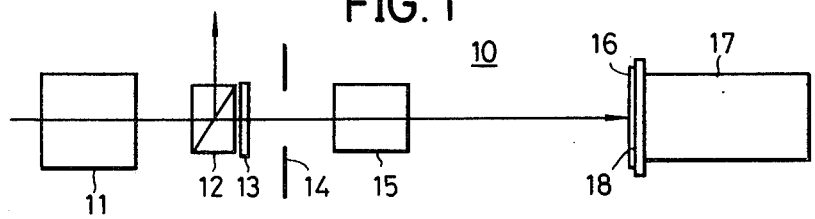
FIG. 1 is a diagram showing an embodiment of an optical system in general of a television camera having an optical lowpass filter according to the present invention.

In a television camera 10 shown in FIG. 1, a part of a beam from an image which has passed through a zoom lens system 11, is reflected at a prism 12 and is directed towards a view finder system (not shown). The remaining part of the beam passes directly through the prism 12, and passes through an optical lowpass filter 13 which constitutes an essential part of the present invention, an iris 14, and a master lens system 15. The beam which has passed through the master lens system 15 further passes through a color stripe filter 16 provided at the front surface of an image pickup tube 17, and the image formation is obtained on an image pickup surface 18 of the image pickup tube 17.

Figure 2:
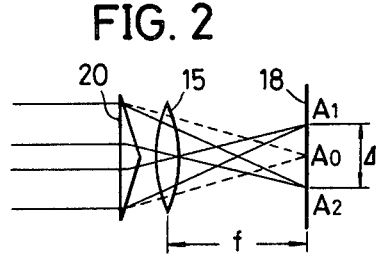
FIG. 2 is a diagram showing an optical system for explaining the principles of an optical lowpass filter using a bi-prism which was previously proposed by the present inventors.

A part of the filter part in the optical lowpass filter 13 is shown in an enlarged scale in FIG. 2. As shown in FIG. 2, the filter part of the optical lowpass filter 13 consists of a plurality of bi-prisms 20, for example. The beam which passes through the bi-prisms 20 is refracted, and forms image formations at two mutually separated points A1 and A2.

Figure 3:
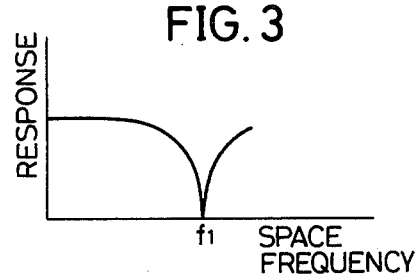
FIG. 3 is a diagram showing the frequency characteristic of an optical lowpass filter.

Hence, since the image formation is obtained at two positions, the optical image thus obtained becomes faded. When the fading width between the points A1 and A2 is designated by Δ, the optical transfer function (OTF) of the optical system can be described by a cosine function in which the response becomes zero when the fading width is equal to Δ. Accordingly, an optical lowpass filter characteristic can be obtained which has an attenuation pole at a frequency f1 as indicated in FIG. 3.

Next, an embodiment of the optical lowpass filter 13 in the television camera 10 according to the present invention will be described in conjunction with FIG. 4A. An optical lowpass filter 13a consists of a square transparent acrylic resin plate 30, and is unitarily formed with a plurality of bi-prisms 31 at the lower half thereof. Thus, the upper half of the plate 30 in the optical lowpass filter 13a does not function as an optical lowpass filter, and only the lower half thereof functions as the optical lowpass filter. The optical lowpass filter 13a is mounted so that the center of a boundary 32 between a flat transparent plate part 30a of the plate 30 and the bi-prisms 31, and the center of an aperture in the iris 14 coincide. Therefore, even when the stopping rate of the iris 14 to stop the incoming beam varies, the rate of the optical lowpass filter effect given with respect to the beam in the effective light path which passes through the iris 14, is always constant.

Figure 5:
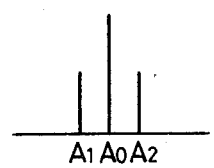
FIG. 5 is a diagram for explaining the energy distribution of the optical image at the image pickup surface.

Accordingly, when the energy distribution (spectrum) of the optical image at the image pickup surface 18 of the image pickup tube 17 is shown with a corresponding relation with FIG. 2, a spectrum indicated in FIG. 5 can be obtained. That is, due to the function of an optical lowpass filter part 30b, faded images are formed at the points A1 and A2, and an image which is not faded is formed at a center position A0 due to the function of the flat transparent plate part 30a.

The above optical lowpass filter 13a (13) is provided within an afocal system between the zoom lens system 11 and the master lens system 15. Thus, the optical lowpass filter 13a (13) gives half the optical lowpass filter effect in terms of the quantity, with respect to the parallel beam in the effective light path which passes through the iris 14. Hence, the signal picked up by the image pickup tube 17 is suitably free the color beat generation. Moreover, since half of the beam which passes through the optical lowpass filter 13a in terms of quantity is not subjected to the above optical lowpass filter effect, the degradation in the resolution is slight compared to the conventional case where the entire beam is subjected to the optical lowpass filter effect.

Due to the delicate balance between preventing the color beat generation and preventing the degradation in the resolution, it is most suitable to set the quantity for giving the optical lowpass filter effect to the beam, to approximately 50%. That is, it is most suitable to cover 50% of the cross-sectional area of the effective light path with the optical lowpass filter. The object of the present invention may be realized if the above quantity is in the range between 20% to 80%.

Figure 4A:
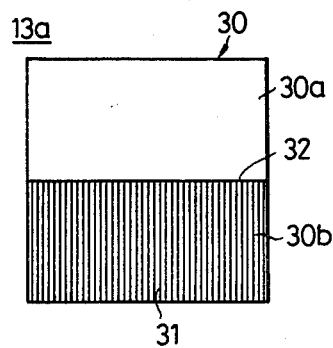
FIGS. 4A and 4B are front views respectively showing an embodiment and its modification of an optical lowpass filter used in the television camera according to the present invention.
Figure 4B:
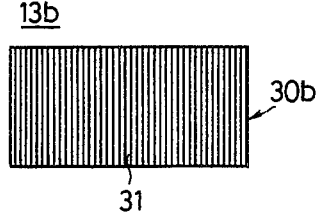

As a modification of the above optical lowpass filter 13a, an optical lowpass filter 13b shown in FIG. 4B may be used. The optical lowpass filter 13b does not have the flat transparent plate part 30a at the upper half thereof, and only consists of the optical lowpass filter part 30b having bi-prisms 31 unitarily formed on a rectangular transparent acrylic resin plate. The size of the optical lowpass filter 13b is half the size of the plate 30 of the optical lowpass filter 13a.

The above optical lowpass filter 13b is supported and provided so as to cover the lower half of the effective light path which passes through the iris 14. In addition, the optical lowpass filter 13b may be adhered to the prism 12 by an adhesive.

In the above embodiment and its modification of the optical lowpass filter shown in FIGS. 4A and 4B, the optical lowpass filter part 30b covers the lower half of the light path. However, the construction of the optical lowpass filter is not limited to the above, and the optical lowpass filter part 30b may be constructed to cover the upper half, the right half, the left half, or even the half bounded by the diagonal line.

Next, description will be given with respect to another embodiment of the optical lowpass filter 13, by referring to FIG. 6A. An optical lowpass filter 13c consists of a square transparent acrylic resin plate 40, and is formed with a plurality of bi-prisms 41 within a circle at the center thereof. Accordingly, in the optical lowpass filter 13c, the outer part of the circle at the center of the plate 40 is a flat transparent plate part 40a and does not function as the optical lowpass filter. The inner part of the circle at the center of the plate 40 forms an optical lowpass filter part 40b which functions as the optical lowpass filter. The above optical lowpass filter 13c is supported and provided so that the center of the optical lowpass filter part 40b coincides with the center of the aperture in the iris 14.

By use of a television camera provided with the optical lowpass filter 13c, when an image is to be picked up in a room wherein the illumination is relatively low, for example, the passing rate of the iris 14 becomes large. Here, the beam in the effective light path which passes through the iris 14 is the beam which has passed through the optical lowpass filter part 40b of the optical lowpass filter 13c and the beam which has passed through the flat transparent plate part 40a. As the passing rate of the iris 14 becomes large, the quantity of beam which passes through the flat transparent plate part 40a increases. On the other hand, regardless of the passing rate of the iris 14, the quantity of beam which passes through the optical lowpass filter part 40b is constant. Accordingly, when the illumination with respect to the image is low and the passing rate of the iris 14 becomes large, the ratio of the beam which has passed through the optical lowpass filter part 40b with respect to the entire beam in the effective light path becomes small.

Therefore, in a relatively dark room as described above, the contrast ratio of the image is small and the high space frequency components which facilitate the generation of the color beat do not exist in large numbers. Hence, during an image pickup operation in the above type of a room, the optical lowpass filter effect becomes relatively low as described above, and is suitable in that the resolution is improved.

On the other hand, when the image is picked up outdoors where the illumination is relatively high, the passing rate of the iris 14 becomes small. As the passing rate of the iris 14 becomes small, the quantity of the beam whcih passes through the flat transparent plate part 40a decreases. On the other hand, regardless of the passing rate of the iris 14, the quantity of the beam which passes through the optical lowpass filter part 40b is constant. Accordingly, the ratio of the beam which has passed through the flat transparent plate part 40a of the optical lowpass filter 13c of the beam in the effective light path which passes through the iris 14, with respect to the beam which has passed through the optical lowpass filter part 40b, decreases. That is, the ratio of the beam which has passed through the optical lowpass filter part 40b with respect to the entire beam in the effective light path increases.

Thus, the contrast ratio of the image is large outdoors where it is relatively bright, and further, there are many high space frequency components which facilitate the generation of the color beat. Accordingly, when the image pickup operation is performed outdoors, the optical lowpass filter effect becomes relatively large, and the preventive effect to prevent the generation of the color beat is high.

Figure 6A:
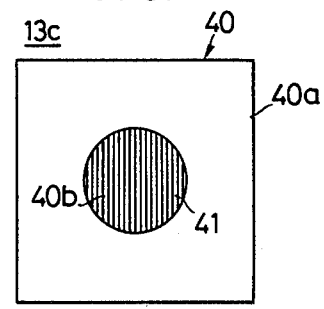
FIGS. 6A and 6B are front views respectively showing another embodiment and its modification of an optical lowpass filter.
Figure 6B:
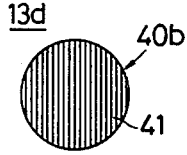

A modification of the optical lowpass filter 13c, that is, an optical lowpass filter 13d shown in FIG. 6B may be used. The optical lowpass filter 13d does not have the flat transparent plate part 40a of the optical lowpass filter 13c, and only consists of the optical lowpass filter part 40b having the bi-prisms 41 unitarily formed on a circular transparent acrylic resin plate. The above optical lowpass filter 13d is adhered onto the prism 12 by use of an adhesive.

The diameter of the optical lowpass filter part 40b is smaller than the diameter of the aperture when the iris 14 is in a fully open and released state, and is selected to a value larger than the diameter of the aperture when the iris 14 is in a maximum stopping state.

The above described optical lowpass filters 13c and 13d shown in FIGS. 6A and 6B may be applied to a television camera which uses a lens with a large aberration and obtains the optical lowpass filter effect by the aberration of the lens itself. That is, in a television camera which uses a lens with a large aberration, the optical lowpass filter effect can be obtained by the aberration of the lens itself when the passing rate of the iris 14 is large (that is, when the stopping value is small). However, the effect due to the aberration of the lens becomes small when the passing rate of the iris is small (that is, when the stopping value is large), and the optical lowpass filter effect becomes small. Therefore, when the above optical lowpass filters 13c and 13d are used in this type of a television camera, a substantially constant optical lowpass filter effect can always be obtained, regardless of the passing rate of the iris.

Further, the present invention is not limited to these embodiments, but various variations and modifications may be made without departing from the scope of the present invention.

What is claimed is:

1. A television camera having an optical system including an iris, a master lens, and a color stripe filter, said television camera further comprising:
   an optical lowpass filter provided within an effective light path of an afocal system which reaches said master lens through said iris, said optical lowpass filter having a shape to partially produce an optical lowpass filter effect with respect to a part of a beam in said effective light path.

2. A television camera as claimed in claim 1 in which said optical lowpass filter has a shape to produce the optical lowpass filter effect with respect to 20% to 80% of the beam in said effective light path.

3. A television camera as claimed in claim 1 in which said optical lowpass filter has a shape to produce the optical lowpass filter effect with respect to 50% of the beam in said effective light path.

4. A television camera as claimed in claim 1 in which said optical lowpass filter comprises an optical lowpass filter part formed in one part of a transparent plate.

5. A television camera as claimed in claim 4 in which half the transparent plate of said optical lowpass filter is formed with the optical lowpass filter part.

6. A television camera as claimed in claim 4 in which said optical lowpass filter part of the optical lowpass filter has a round shape and is formed at a center of the transparent plate adjacent to said iris, such that said lowpass filter part and remaining part of said optical lowpass filter affect the beam in said effective light path when a passing rate of said iris is greater than a predetermined level, and only said lowpass filter part affects the beam in said effective light path when the passing rate of said iris is less than said predetermined level.

7. A television camera as claimed in claim 1 in which said optical lowpass filter is shaped so that it is interposed across a part of said effective light path.

8. A television camera as claimed in claim 7 in which said part of said effective light path is substantially 50% of said effective light path.

9. A television camera as claimed in claim 7 in which said optical lowpass filter has a round shape and is positioned such that the center of said optical lowpass filter coincides with the center of said effective light path, and said optical lowpass filter has a diameter smaller than that of an opened aperture of said iris.

* * * * *